(12) United States Patent
Starenky et al.

(10) Patent No.: US 9,253,134 B2
(45) Date of Patent: Feb. 2, 2016

(54) CREATING REAL-TIME CONVERSATIONS

(71) Applicants: Victor Starenky, Toronto (CA);
Aleksandr V. Kennberg, Waterloo (CA);
Joseph Rideout, Waterloo (CA)

(72) Inventors: Victor Starenky, Toronto (CA);
Aleksandr V. Kennberg, Waterloo (CA);
Joseph Rideout, Waterloo (CA)

(73) Assignee: Google Inc., Mountain View, CA (US)

(*) Notice: Subject to any disclaimer, the term of this patent is extended or adjusted under 35 U.S.C. 154(b) by 131 days.

(21) Appl. No.: 13/692,224

(22) Filed: Dec. 3, 2012

(65) Prior Publication Data
US 2013/0173729 A1 Jul. 4, 2013

Related U.S. Application Data

(60) Provisional application No. 61/582,104, filed on Dec. 30, 2011.

(51) Int. Cl.
*G06F 15/16* (2006.01)
*H04L 12/58* (2006.01)

(52) U.S. Cl.
CPC .............. *H04L 51/20* (2013.01); *H04L 51/04* (2013.01)

(58) Field of Classification Search
CPC ....................................................... H04L 51/20
USPC ................................................. 709/206, 207
See application file for complete search history.

(56) References Cited

U.S. PATENT DOCUMENTS 7,620,689 B2 * 11/2009 LoBuono et al. ............. 709/206
2009/0070294 A1 3/2009 Chijiiwa
2011/0238762 A1 * 9/2011 Soni et al. ..................... 709/206
2011/0252101 A1 * 10/2011 Davis et al. ................... 709/206
2011/0269452 A1 11/2011 Roumeliotis et al.
2012/0075338 A1 * 3/2012 Curtis et al. .................. 345/629
2012/0317205 A1 * 12/2012 Lahiani et al. ................ 709/206

OTHER PUBLICATIONS

International Search Report, dated Apr. 12, 2013 for related PCT Application No. PCT/US12/69773 filed Dec. 14, 2012.
Non-Final Rejection, dated Nov. 6, 2014, for U.S. Appl. No. 13/692,179.
Examination Report, dated Nov. 20, 2014 for related Australian Patent Application No. 2012327213.
USPTO; final rejection, related U.S. Appl. No. 13/692,179, dated Feb. 27, 2015.
Final Rejection, dated Jun. 18, 2015 for U.S. Appl. No. 13/692,179.
International Preliminary Report on Patentability, dated May 14, 2015 for related PCT Application No. PCT/US12/69773 filed Dec. 14, 2012.
Written Opinion, dated Apr. 12, 2013 for related PCT Application No. PCT/US12/69773 filed Dec. 14, 2012.

* cited by examiner

*Primary Examiner* — Ario Etienne
*Assistant Examiner* — Sahera Halim
(74) *Attorney, Agent, or Firm* — IP Spring

(57) ABSTRACT

Methods, systems, and apparatus, including computer programs encoded on computer storage media, for creating conversations related to a location. One method includes receiving a topic for a real-time conversation from a user, receiving location information related to a location of the user, and creating a real-time conversation object that includes the received topic. The method also includes tagging the created real-time conversation object with the received location information, indexing, based on the received topic and the received location information, the tagged real-time conversation object with respect to other real-time conversation objects, and providing the tagged real-time conversation object in response to a search for real-time conversation objects received from another user.

18 Claims, 12 Drawing Sheets

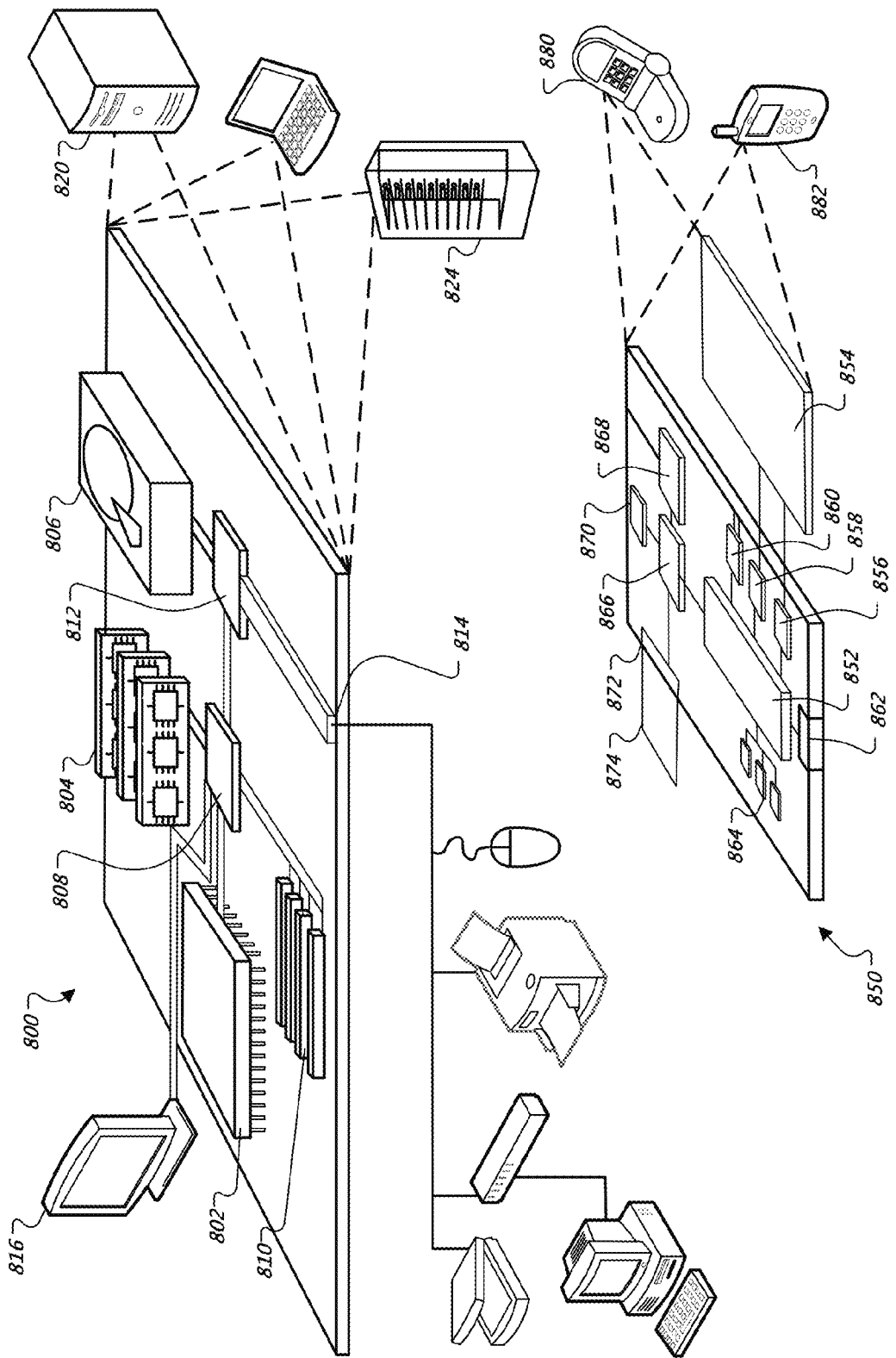

CREATING REAL-TIME CONVERSATIONS

RELATED APPLICATION DATA

This application claims the benefit under 35 U.S.C. §119(e) of U.S. Provisional Patent Application No. 61/582,104, entitled "Creating Real-Time Conversations," filed Dec. 30, 2011; the disclosure of which is incorporated herein by reference in its entirety.

BACKGROUND

This specification relates to the creation of a conversation in an online environment. The Internet has provided a medium for many new forms of communication. From e-mail to chat rooms to instant messaging, Internet users have the ability to talk to one or many of their friends within moments from anywhere in the world. Moreover, as computing devices have become smaller and wireless, these new forms of communication have become increasingly mobile.

SUMMARY

Users can quickly share information about places, things, and events that occur nearby the users, by creating real-time online conversations. For each conversation created by a user, a server can create a conversation object that is tied to a geographic location and a time, and can index the conversation object such that the conversation can be easily found by other users that are near the location shortly after the conversation is created.

One innovative aspect of the subject matter described in this specification is embodied in methods that include the actions of: receiving, at a server, a topic for a real-time conversation from a user; receiving, at the server, location information related to a location of the user; creating, at the server, a real-time conversation object that includes the received topic; tagging the created real-time conversation object with the received location information; indexing, based on the received topic and the received location information, the tagged real-time conversation object with respect to other real-time conversation objects; and providing the tagged real-time conversation object in response to a search for real-time conversation objects received from another user.

Another innovative aspect of the subject matter described in this specification is embodied in methods that include the actions of: receiving, at a server, location information related to a location of a user; determining a plurality of real-time conversation objects that are associated with locations within an area related to the received location of the computing device, the location associated with each of the plurality of real-time conversation objects indicating a location of a user at the time the user requested creation of the real-time conversation object; and sending, to a computing device of the user, information representing the determined real-time conversation objects.

Another innovative aspect of the subject matter described in this specification is embodied in methods that include the actions of: receiving, at a server, location information related to a location of a user; determining a plurality of real-time conversation objects that are associated with locations within an area related to the received location of the user and associated with a threshold level of message activity over a certain period of time; and sending, to a computing device of the user, information representing the selected real-time conversation objects.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, the location information may received from a computing device of the user and based on an output of a Global Positioning System (GPS) sensor included in the computing device of the user. Alternatively or additionally, the actions may include: receiving, from the user, a list of other users to invite to be associated with the created real-time conversation object; sending, to the other users included in the received list, invitations to be associated with the created real-time conversation object; receiving, from one or more of the other users, an acceptance of the invitation; and updating the created real-time conversation object to include indicators of the one or more other users that accepted the invitation.

Indexing the tagged real-time conversation object may include updating, based on the location information, an index of real-time conversation objects stored on the server to include the tagged real-time conversation object. Updating the index of real-time conversation objects stored on the server to include the tagged real-time conversation object may include sorting the real-time conversation objects included in the index based on locations associated with each of the real-time conversation objects. Updating the index of real-time conversation objects stored on the server to include the tagged real-time conversation object may include sorting the real-time conversation objects included in the index based on a level of message activity over a certain period of time associated with each real-time conversation object.

The actions may further include receiving a request from the user to create the real-time conversation object. Receiving location information related to the location of the user may include receiving location information that indicates the location of the user at the time the user requested the creation of the real-time conversation object. And tagging the created real-time conversation object with the received location information may include tagging the created real-time conversation object with the location of the user at the time the user requested the creation of the real-time conversation object and maintaining the location with which the created real-time conversation object is tagged regardless of whether a current location of the user changes.

The actions may further include receiving, at the server, a selection of a real-time conversation objects from the determined real-time conversation objects; and sending, to the computing device of the user, a link to the selected real-time conversation object. The action may further include receiving, from the computing device of the user, message information to be posted to the real-time conversation object; and updating the real-time conversation object with the received message information and the time at which the message information was received.

Determining a plurality of real-time conversation objects may include determining a plurality of real-time conversation objects that are associated with a threshold level of message activity over a certain period of time. Determining a plurality of real-time conversation objects may also include determining a plurality of real-time conversation objects that are associated with one or more other users with whom the user of the computing device has indicated a relationship.

The subject matter described in this specification provides several advantages. For example, real-time conversations created by the systems described herein do not need to be associated with a particular business or venue (e.g., a restaurant). Similarly, the real-time conversations may be associated with any topic. In other words, users that create real-time conversations are not limited to a list of pre-selected topics. In addition, the systems described herein allow users to quickly discover the most relevant real-time conversations that are associated with locations near a user's current location.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 8 is a block diagram illustrating an example of a computer system.

Like reference symbols in the various drawings indicate like elements.

DETAILED DESCRIPTION

Following is a description of systems and processes for creating and hosting interactive, real-time conversations based on a user's location. Real-time conversations provide a platform for users to exchange messages in a continuously streaming environment. As will be described in more detail with reference to the figures, the described system harnesses the mobility of modern computing devices and allows a user to create a real-time conversation based on the user's location and any topic the user chooses.

There are various types of real-time conversations. One example such example is instant messaging, a form of direct, text-based chatting communication where the messages are pushed to participants in real-time. Other examples include Internet Relay Chat (IRC) and certain forms of mobile text messaging. However, the real-time conversations referred to herein are not limited to any of these implementations and encompass any types of conversation platforms that permit the exchange of messages in real-time.

Figure 1:
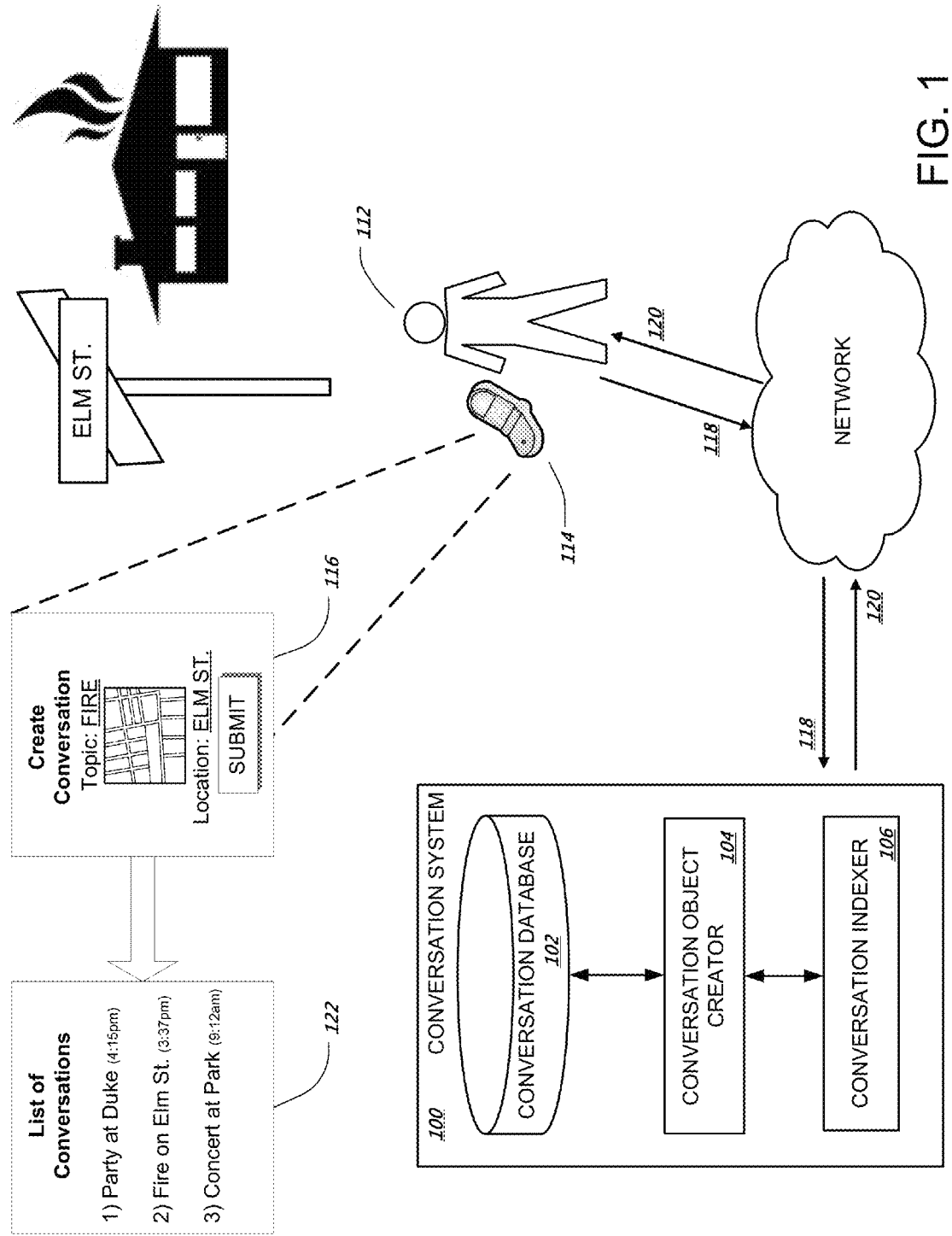
FIG. 1 illustrates an example system for creating a conversation.

FIG. 1 illustrates an example system for creating a real-time conversation. The conversation system 100 can be implemented as, for example, computer programs running on one or more computers in one or more locations that are coupled to each other through a network. The conversation system 100 includes a conversation database 102, a conversation object creator 104, and a conversation indexer 106.

The conversation database 102 stores real-time conversation objects that represent real-time conversations between users. Each real-time conversation object is related to a location and a topic, as well as other parameters (e.g., time). The conversation object creator 104 receives various parameters regarding a proposed real-time conversation, including the location and the topic, and creates a real-time conversation object that includes the received parameters. Beyond a location and topic, the parameters of a real-time conversation may include, for example, a list of users that should be invited to join the conversation, an icon representing the conversation, and one or more messages to begin the conversation.

Each real-time conversation object stores the entire contents of the real-time conversation. For example, the real-time conversation object stores all previous messages contributed to the conversation, the time and date each message was contributed, the user that contributed the message, identifiers of all users that have joined the conversation, and an indication of those members that are currently participating in the conversation. Moreover, each real-time conversation object provides a platform for a plurality of users associated with a common location to interactively communicate about a geographically relevant topic. However, in the creation of a real-time conversation object, the user is not limited to a predetermined list of topics or categories. Rather, a user may organically create a real-time conversation based on any topic relevant to the user's location.

The conversation indexer 106 stores the real-time conversation objects created by the conversation object creator 104 in the conversation database 102 and indexes the created real-time conversation object with respect to a plurality of other real-time conversation objects stored in the conversation database. By indexing the created conversation, the conversation indexer 106 enables other users to search for the created conversation in the conversation database 102.

A user 112 generally interacts with the conversation system 100 through a user device 114. For example, the user device 114 can be a mobile device coupled to the conversation system 100 through a local area network (LAN) or wide area network (WAN), e.g., the Internet. The user 112 may interface with the conversation system 100 in various ways. For example, the user 112 may interface with the conversation system 100 by accessing a webpage associated with the conversation system 100 on a browser application on the user device 114. Alternatively or additionally, an application may be installed on the user device 114 that, when executed, provides an interface to the conversation system 100.

When creating a real-time conversation, the user 112 may be presented with a creation screen 116. Through interaction with the creation screen 116, the user 112 may submit conversation parameters (e.g., location and topic) to the conversation system 100. For example, while walking down Elm Street, the user 112 may encounter a house that is on fire. Through creation screen 116, the user 112 may submit, to the conversation system 100, conversation parameters 118 that include a location of "Elm Street" and a topic of "Fire."

The conversation object creator 104 receives and creates a real-time conversation object based on the conversation parameters 118. The conversation indexer 106 stores the real-time conversation objects created by the conversation object creator 104 in the conversation database 102 and indexes the created conversation object with respect to a plurality of other real-time conversation objects stored in the conversation database. The conversation indexer 106 provides users with the ability to discover what is happening around them right now. The conversation system 100 returns data 120 regarding the created and indexed conversation object to the user device 114. The data 120 may include, for example, a link to the real-time conversation object so that the user device 114 may display the conversation and allow the user 112 to interact with the conversation. Moreover, when the user device 114 accesses a screen providing a list of conversations 122, the created and indexed conversation may be included.

In certain implementations, protective steps may be taken with respect to user privacy. For example, depending on the particular type of data being used, the services being provided, and the ability to provide certain services with modified data, a system may provide users with the opportunity to opt in/out of services that may collect personal information, may partially or fully anonymize data so as to prevent personally identifiable information from being disclosed, and may perform similar operations with respect to user location data, user preference data, and other data relating to users of the system.

Figure 2:
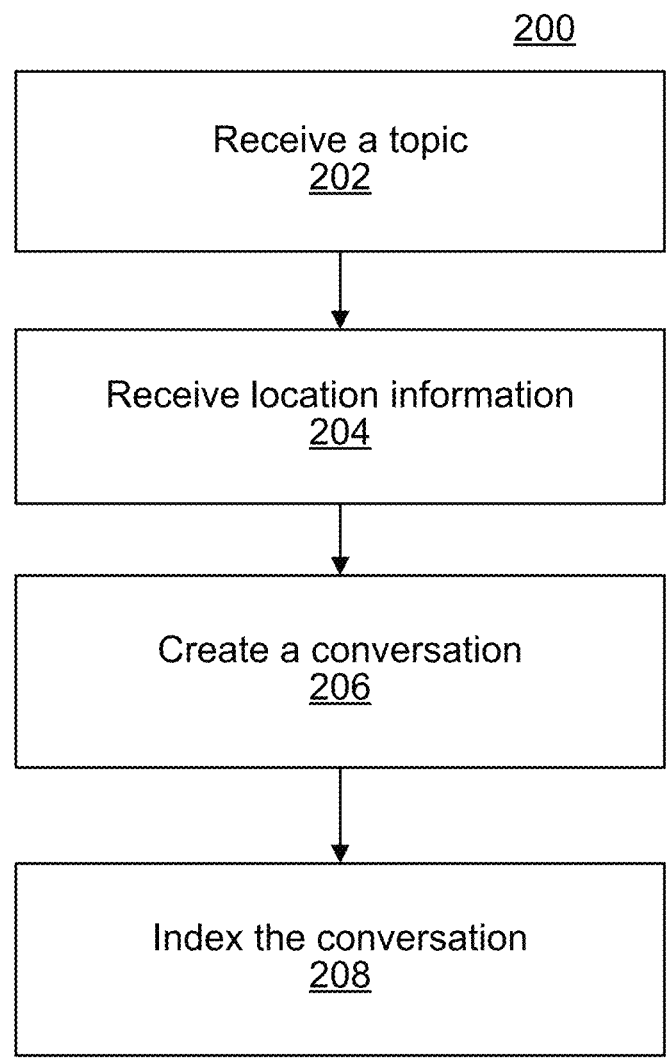
FIG. 2 is a flow diagram of an example method for creating and indexing a conversation.

FIG. 2 is a flow diagram of an example method 200 for creating and indexing a real-time conversation. For convenience, the method 200 is described with reference to a system of one or more servers that performs the method. The system can be, for example, the conversation system 100 described above with reference to FIG. 1.

The system receives a topic for a real-time conversation from a user (202). The topic may be identified by any string of characters that the user chooses to use to represent the conversation. For example, the topic could be "Concert in the Park" or "Free doughnuts on the corner!" The user may provide her own topic or may select from a list of topics provided by the system. The topic of conversation provides an indication to other users of the subject of the conversation.

The system also receives location information for the conversation (204). The location information may indicate the present location of the user. The location information may also indicate a location other than a business, for example, a street, a neighborhood, or a landmark. The location information may be determined in various manners. In some implementations, the location information may correspond to a location provided by the user device from which the user is submitting the location information. In other implementations, the user may specify the location information by manually providing an indication of the location information by, for example, selecting the location from a map displayed by the user device or by providing an address of the location.

The system may also receive other parameters related to the real-time conversation. For example, the user may specify an icon to represent the real-time conversation. The user may select the icon from a list of icons provided by the system or the user may provide her own icon from a different source. Additionally or alternatively, the user may specify a list of other users she would like to invite to the real-time conversation. When the system receives a list of other users to invite to the real-time conversation, the system may send a link to the real-time conversation object to the other users. The other users may access the link to the real-time conversation object and participate in the real-time conversation.

Additionally or alternatively, the user may specify whether the real-time conversation is to be made public or private. The system may make public conversations accessible to any other users that search for them. On the other hand, the system my limit accessibility of private conversations to those other users that the user creating the real-time conversation invites to join. Additionally or alternatively, the user may provide one or more messages to be included in the real-time conversation object. In other words, the user may provide a seed for the conversation by including an initial message to which other users may respond.

The system creates a real-time conversation object that includes the received topic and location information (206). The system may also include, in the real-time conversation object, any of the other received parameters related to the conversation. The real-time conversation object may be any data structure that relates the received parameters and the messages related to the conversation. For example, the system may create a real-time conversation object by creating an XML structure that represents the conversation. Alternatively, the system may create a real-time conversation object by creating a database object related to the conversation.

The created real-time conversation object includes a thread of messages received by the system from one or more users. Once created, the system continuously updates the thread of messages to include any additional messages that are received in relation to the real-time conversation. In some implementations, the system may also include information related to the state of the conversation in the real-time conversation object. For example, the real-time conversation object may include information indicating the number of other users that have joined the conversation or that have actively participated in the conversation, as well as an indication of these other users' identities. In other words, the real-time conversation object represents on ongoing exchange in which users contribute in real-time.

The system may use the indication of the identities other users who have joined the real-time conversation to send updates of the conversation to the other users. The real-time conversation object may include information indicating the last time that a message was posted in the conversation, which the system may use to sort the real-time conversation object with respect to other real-time conversation objects.

Moreover, the system may tag the real-time conversation object with the received location information. In particular, the real-time conversation object may be updated to store a representation of the location information. The system may use any format for specifying the location of the real-time conversation.

In some implementations, the location information associated with the real-time conversation object may be static. For example, the real-time conversation object may be permanently tagged with the location specified by the user during the creation of the real-time conversation object. In other implementations, the location information associated with the real-time conversation object may be dynamic. For example, as the user that created the real-time conversation object moves, the location information associated with the real-time conversation object may be continuously or periodically updated with the new location of the user.

The system indexes the created real-time conversation object with respect to a plurality of real-time conversation objects such that the created conversation object is searchable by other users (208). The system stores a plurality of real-time conversation objects. Each real-time conversation object may include any combination of the conversation parameters described above, as well as any other parameters.

In some implementations, each real-time conversation object includes at least a location and a topic. The system may index the real-time conversation objects based on one or more of the parameters included in the real-time conversation object. For example, the system may index the real-time conversation objects based on the location and the topic of the conversation. Indexing the real-time conversation objects allows the system to make the real-time conversation objects searchable by users, as will be described in greater detail below with regard to FIG. 5.

Figure 3A:
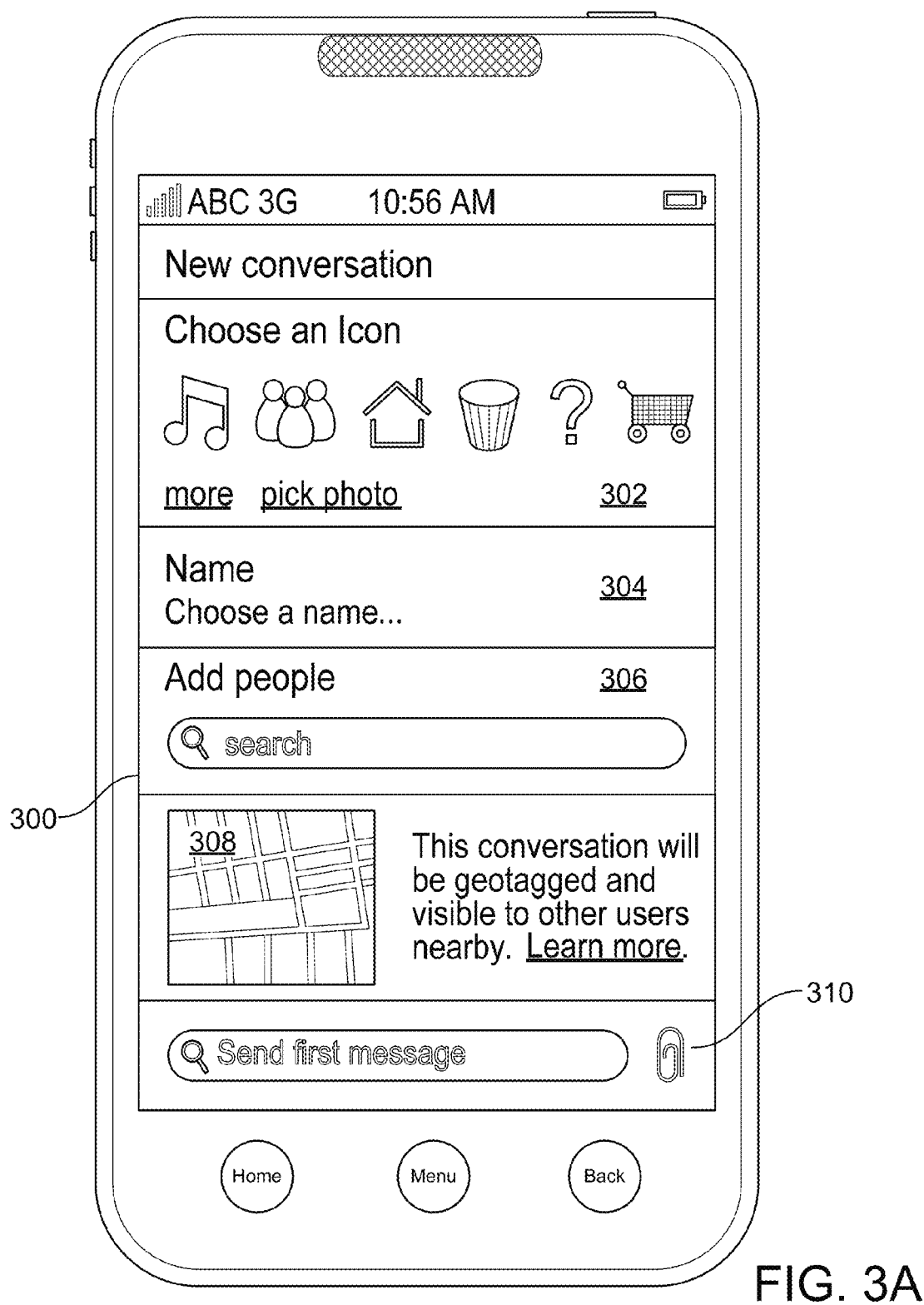
FIGS. 3A-3C illustrate examples of interfaces for use in the creation of a conversation object.
Figure 3B:
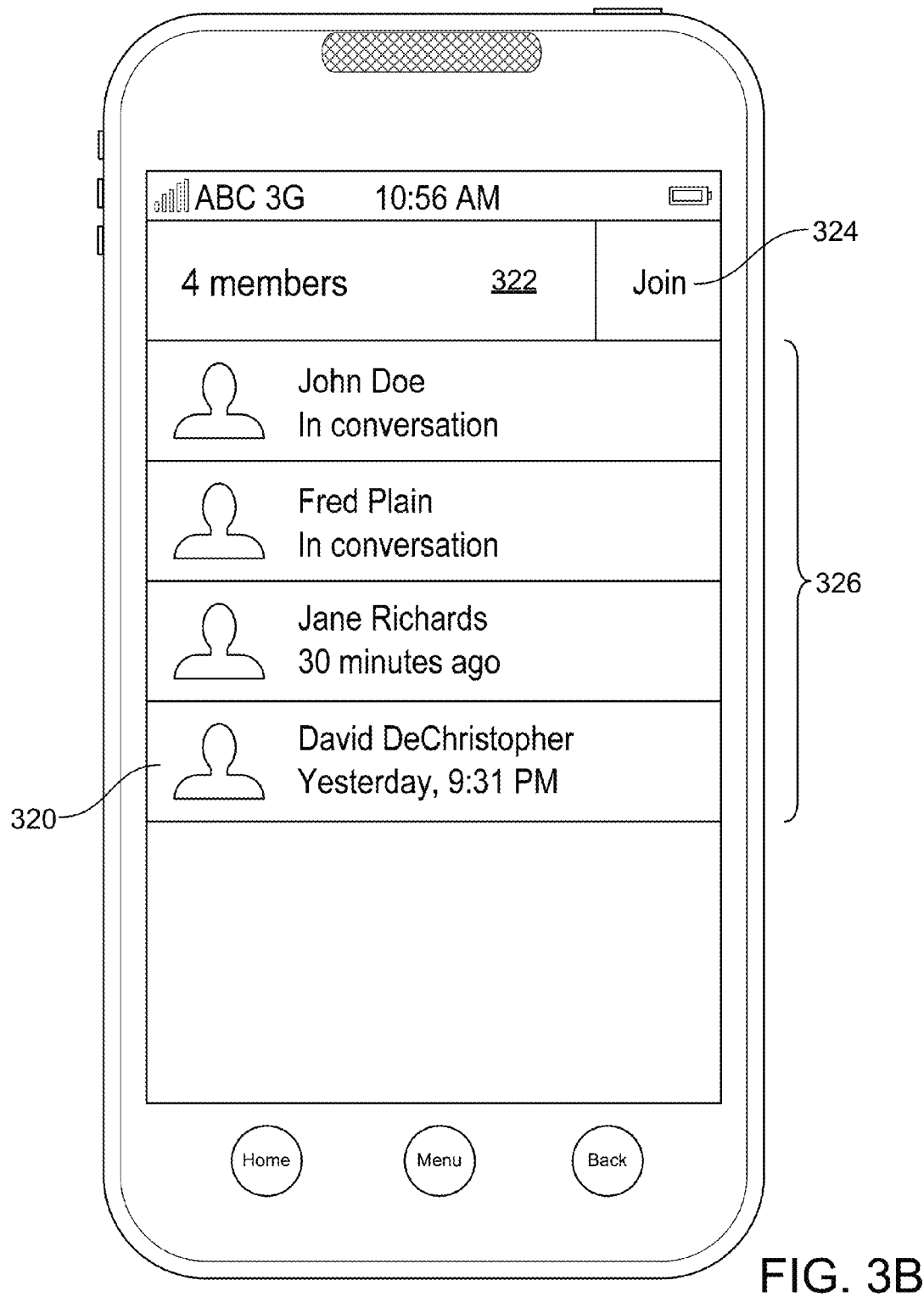
Figure 3C:
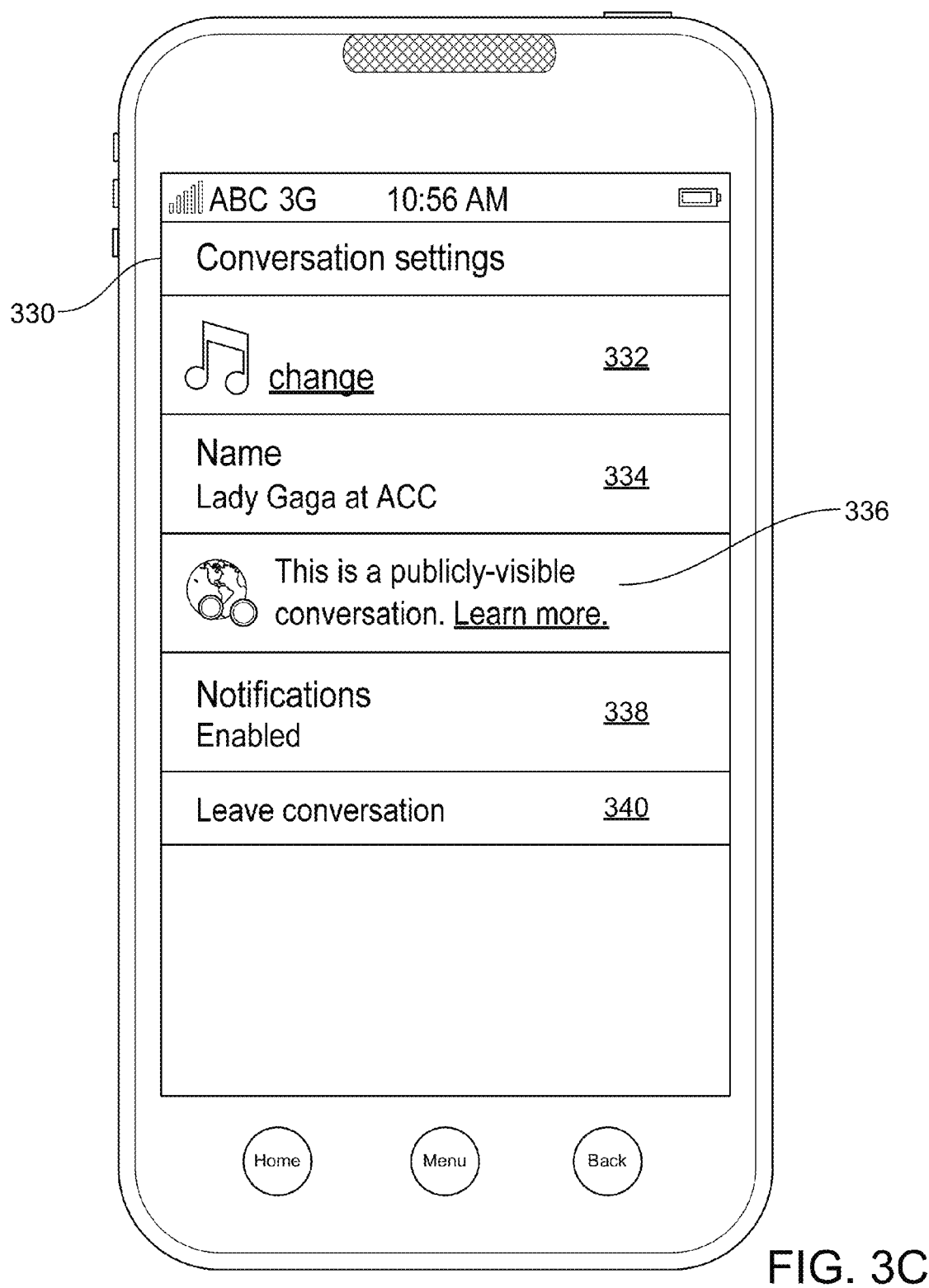

FIGS. 3A-3C illustrate examples of interfaces for use in the creation of a real-time conversation object. The interfaces are described with reference to a system of one or more servers that provide the interfaces to a user and a user device. The system can be, for example, the conversation system 100 described above with reference to FIG. 1. The user device may be, for example, a mobile telephone.

The interface 300 shown in FIG. 3A represents a portal for a user to provide parameters in the process of creating a real-time conversation. The interface 300 includes various regions. The interface 300 may include a region 302 that provides a user with a choice of icons with which to represent the real-time conversation being created. The interface 300 may include a region 304 that permits a user to specify the name or topic of the real-time conversation. The region 304 may include text field in which a user may enter a name or topic. Alternatively or additionally, the region 304 may include a pull-down menu that includes a list of suggested topics or names. However, the interface 300 is designed so as to permit a user to freely create a real-time conversation without limits on the subject or category of the conversation.

The interface 300 may include a region 306 that permits a user to specify a list of other users that the user would like to invite to join the real-time conversation being created. The region 306 may include a search field that permits a user to search for other users to include in the invitation list and/or may include a pull-down menu that includes a list of other users that are associated with the user creating the real-time conversation (e.g., a list of "friends").

The interface 300 may include a region 308 that relates to a location associated with the real-time conversation. In some implementations, where the location of the conversation is automatically determined and provided by the user device, the region 308 may include a map showing the location of the user device and an advisory to the user that the conversation will be visible to nearby users, if the conversation is not made private.

In some implementations, where the location of the conversation is manually provided by the user device, the region 308 may include a map with which the user may interact to specify a location for the conversation. Alternatively or additionally, the region 308 may include a text field in which a user may enter, for example, an address or keyword to specify a location for the conversation.

The interface 300 may include a region 308 that permits a user to enter a message to be included in the conversation. The region 308 may include a text field in which a user may enter a message. The interface 300 may include other regions for specifying other parameters related to the conversation being created. For example, the interface may include a region that permits the user to designate the conversation as either private or public.

Generally, the interface 300 provides a single mechanism through which a user may create a conversation about any topic. The user need not enter a location and have a topic selected for her. Similarly, the user need not search through a list of pre-selected locations, for example, a list of businesses. Rather, the interface 300 allows a user to specify any topic that is relevant to the user's experience at a given location.

The interface 320 shown in FIG. 3B represents a status of a created conversation. The interface 320 includes various regions. The interface 320 may include a region 322 that indicates the number of users that have joined the real-time conversation. The interface 320 may include a region 324 that permits a user to join the conversation. Region 324 may be a button that, when pressed, causes the system to join the user to the conversation.

Region 326 may include a list of users that are currently joined to the real-time conversation. For users included in the region 326, the interface 320 may include an indication of the user's identity, the last time the user participated in the real-time conversation, and an icon that represents the user. For example, the indication of the user's identity may be the user's name or a handle associated with the user. The indication of the last time the user participated in the real-time conversation may include the date and time at which the user last contributed a message to the real-time conversation. When a user is currently viewing the message thread of the real-time conversation or actively typing a message to be posted in the message thread, the indication of the last time the user participated in the conversation may indicate that the user is "in conversation," "currently participating," or some variation thereof. Thus, participating in and being joined to a real-time conversation are distinct states. When a user is participating in a real-time conversation, the user is actively interacting with the real-time conversation object. On the other hand, a user joins a conversation regarding which the user wants to be notified of updates and with which the user generally wants to be associated.

Once a user has joined a real-time conversation, the user may access the conversation's settings through, for example, an interface similar to the interface 330 that is shown in FIG. 3C. The interface 330 includes various regions. The interface 330 may include a region 332 that permits a user to change the tone or music emitted by the user device when the real-time conversation is updated with, for example, a new message. The interface 330 may include a region 334 that indicates the name or topic of the real-time conversation. In some implementations, the region 334 may permit a user that has joined the real-time conversation to change the name or topic. Alternatively, the region 334 may only permit the user who created the real-time conversation to change the name or topic and may simply display the name or topic to all other users.

The interface 330 may include a region 336 that indicates whether the real-time conversation is public or private. Similar to region 334, region 336 may permit a user that has joined the real-time conversation to change the setting of the conversation from public to private and vice versa. Alternatively, the region 334 may only permit the user who created the real-time conversation to change the setting of the conversation from public to private and vice versa.

The interface 330 may include a region 338 that permits a user to manage the notifications that the user device provides to the user in relation to the real-time conversation. For example, the user device may be configured to notify the user when a new message has been posted in the real-time conversation or only when messages from certain users have been posted in the real-time conversation. Additionally or alternatively, the user device may be configured to notify the user when another user has joined and/or left the real-time conversation. Additionally or alternatively, the user device may be configured to notify the user when the user is located within a certain distance of the location associated with the real-time conversation. The interface 330 may include a region 340 that permits a user to leave the real-time conversation.

Figure 4:
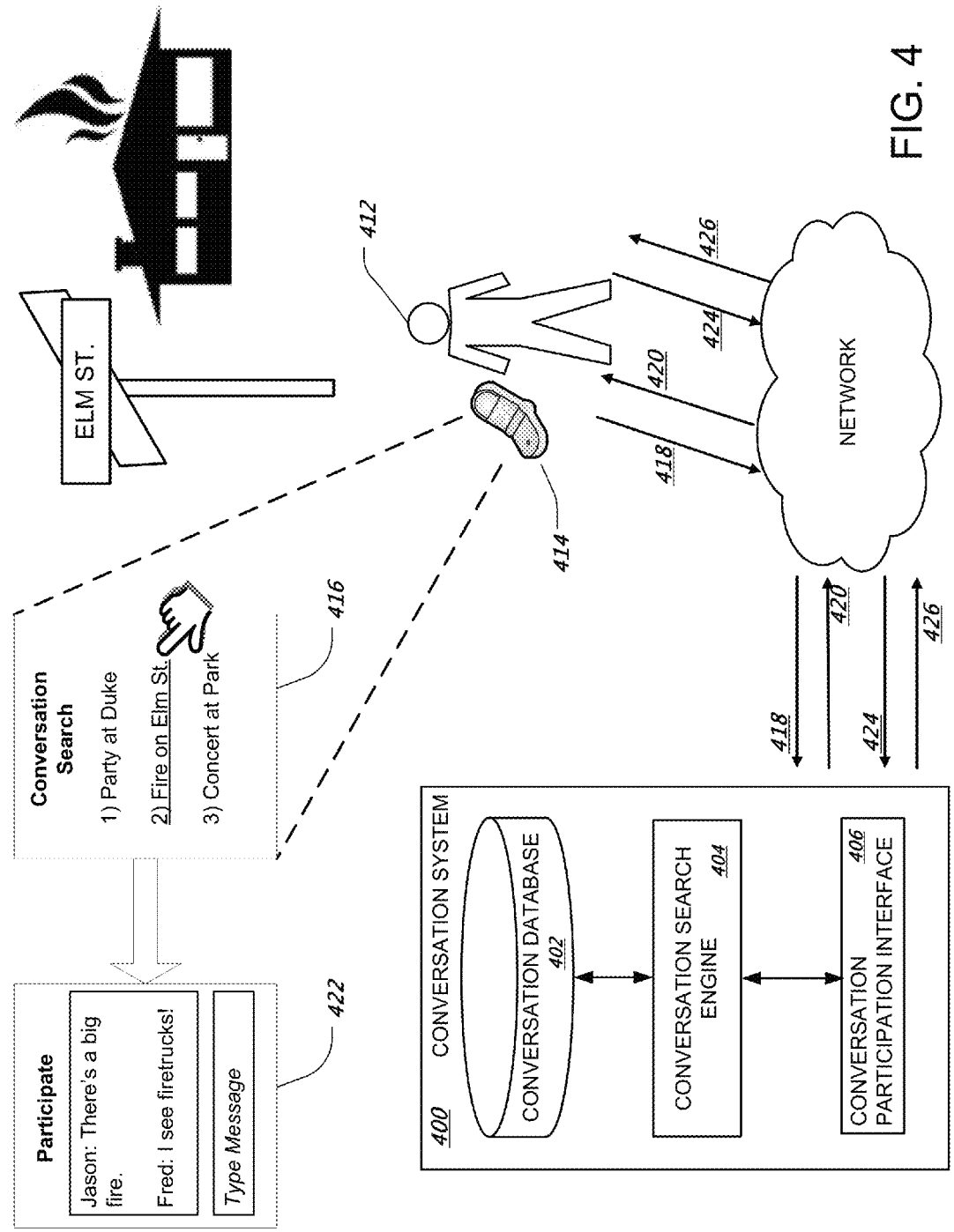
FIG. 4 illustrates an example system for discovering and participating in a conversation.

FIG. 4 illustrates an example system for finding and joining real-time conversations. Once a real-time conversation object has been created, the conversation system 400 provides users with the ability to find out what is happening around them in real-time. As a user moves between streets or neighborhoods, the conversation system 400 will present the user with a list of real-time conversations that are both relevant to the user's location and are being actively conducted concurrent with the user's travels.

The conversation system 400 can be implemented as, for example, computer programs running on one or more computers in one or more locations that are coupled to each other through a network. The conversation system 400 may be implemented on the same one or more computers as conversation system 100 as described above with regard to FIG. 1. However, conversation system 400 may be implemented as a separate system on one or more other computers.

The conversation system 400 includes a conversation database 402, a conversation search engine 404, and a conversation participation interface 406. The conversation database 402 stores indexed conversation objects that represent real-time conversations between users. Each real-time conversation object may be related to a location and a topic, as well as other parameters. As described above, the stored real-time conversation objects are indexed by the parameters to which the real-time conversation objects are associated.

The conversation search engine 404 may receive an indication of one or more parameters based upon which conversation search engine 404 searches for real-time conversations. For example, the conversation search engine 404 may receive an indication of a location based upon which conversation search engine 404 searches for real-time conversations. Alternatively or additionally, the conversation search engine 404 may receive one or more search terms related to the name or topic of a real-time conversation. The conversation search engine 404 may search the stored indexes for the received parameters and return a list of real-time conversations related to the received parameters.

The conversation participation interface 406 provides an interface through which a user may view and post messages to a selected real-time conversation. The conversation participation interface 406 may receive a message from a user device and store the message in a message thread included in the corresponding real-time conversation object. The conversation participation interface 406 may also receive requests from a user to join and/or leave a real-time conversation and update a list of associated users included in the corresponding real-time conversation object. The conversation participation interface 406 may also receive updates to the settings associated with a real-time conversation object, as described above with regard to FIG. 3C.

A user 412 generally interacts with the search system 400 through a user device 414. For example, the user device 414 can be a mobile device coupled to the conversation system 400 through a local area network (LAN) or wide area network (WAN), e.g., the Internet. The user 412 may interface with the conversation system 400 in various ways. For example, the user 412 may interface with the conversation system 400 by accessing a webpage associated with the conversation system 400 on a browser application on the user device 414. Alternatively or additionally, an application may be installed on the user device 414 that, when executed, provides an interface to the conversation system 400.

When creating a real-time conversation, the user 412 may be presented with a conversation search screen 416. Through interaction with the conversation search screen 416, the user 412 may submit conversation parameters (e.g., location or topic) to the conversation system 400 and search for existing real-time conversations. For example, while walking down Elm Street, the user 412 may encounter a house that is on fire. Through conversation search screen 416, the user 412 may submit, to the conversation system 400, search parameters 418 that include a location of "Elm Street" and/or a topic of "Fire." These parameters 418 may be specified by the user and/or provided automatically by the user device 414. For example, as a user walks onto Elm Street, the user device 414 may provide the user's location to the conversation system 400 in order to obtain a list of conversations relevant to Elm Street.

The conversation search engine 404 receives the search parameters 418 and searches indexes related to the stored real-time conversation objects using the received search parameters 418. The conversation search engine 404 may return data 420 that includes a set of links to real-time conversation objects resulting from the search. The user device 414 may display the set of links to real-time conversation objects as a list of conversations. The user may then select a real-time conversation from the list of conversations to view.

When a user selects a real-time conversation from the list, the user device 414 may access the link to the corresponding real-time conversation object. When accessing a real-time conversation, the user 412 may be presented with a conversation participation screen 422. The conversation participation screen 422 provides a portal to the conversation participation interface 406. Through interaction with the conversation search screen 416, the user 412 may view the various contents of the selected real-time conversation object. For example, the user 412 may be presented with the messages in the message thread included in the real-time conversation object.

Moreover, the user 412 may interact with the conversation participation screen 422 to send changes 424 to conversation participation interface 406 regarding the real-time conversation object. For example, the user 412 may post a new message to the message thread. The conversation participation interface 406 receives the changes 424 and may update the real-time conversation object stored in conversation database 402 accordingly. The conversation participation interface 406 may also send updates 426 to user device 414 related to any real-time conversation objects to which user 412 is joined.

Figure 5:
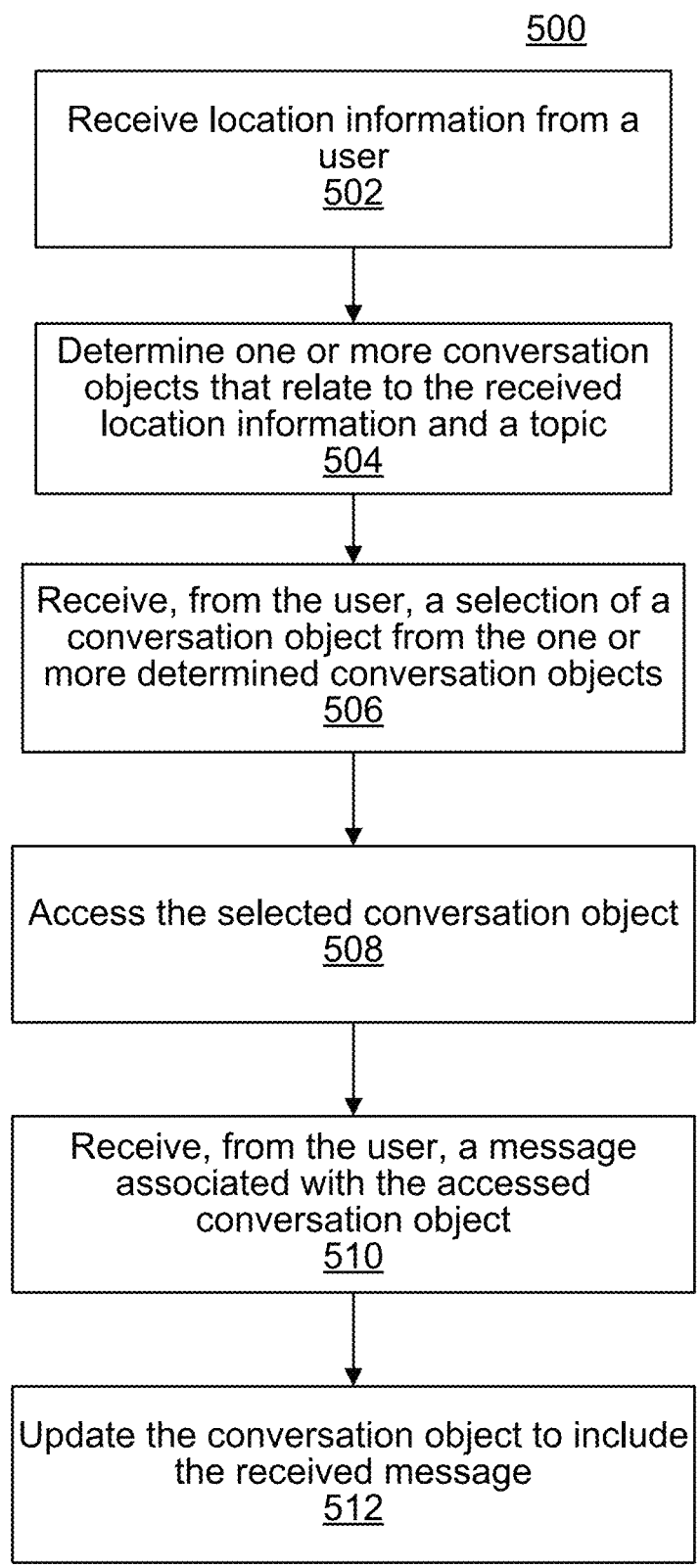
FIG. 5 is a flow diagram of an example method for discovering and participating in a conversation.

FIG. 5 is a flow diagram of an example method 500 discovering and participating in a real-time conversation. For convenience, the method 500 is described with reference to a system of one or more servers that performs the method. The system can be, for example, the conversation system 400 described above with reference to FIG. 4.

The system receives location information from a user (502). The location information may indicate the present location of the user. The location information may also indicate a location other than a business, for example, a street, a neighborhood, or a landmark. The location information may be determined in various manners. In some implementations, the location information may correspond to a location of the user device from which the user is submitting the location information. For example, the user device may determine its location through a global positioning sensor (GPS) included in the user device, through a process of cell tower triangulation, through a process of evaluating a Wi-Fi network connection's signal strength, though an IP address assigned to the user device, or through any combination of these or other methods. In other implementations, the user may specify the location information by manually providing an indication of the location information by, for example, selecting the location from a map displayed by the user device or by providing an address of the location.

The system may receive other search parameters. For example, the system may receive one or more search terms related to the name or topic of a real-time conversation. Alternatively or additionally, the system may receive identifiers associated with users that created or are joined to one or more real-time conversations.

The system determines one or more real-time conversation objects that relate to the received location information (504). The one or more conversation objects may include other conversation parameters (e.g., a topic). To determine the one or more real-time conversation objects that relate to the received location information, the system may search one or more indexes stored by the system. The indexes may include various conversation parameters associated with the real-time conversation objects, including, for example, a location associated with each of the real-time conversation objects. In some implementations, the system determines one or more real-time conversation objects that relate to the received location information by comparing the received location information with the location associated with each of the real-time conversation objects. The system may, for example, determine that a real-time conversation object relates to the received location information where the received location information is within a certain distance of the location associated with the real-time conversation object.

The system may also search for real-time conversation objects based on user preferences. For example, the user may specify that she only wants to search for and be presented with real-time conversations that her friends created or have joined. In other words, the system allows a user to specifically determine what her nearby friends are doing. Alternatively, the user may specify the distance within which the locations associated with real-time conversation objects should be located in order to be included in the returned results. The system may utilize the stored user preferences in conjunction with the specified conversation parameters to search the one or more indexes stored by the system.

The system may present the user with an interface that includes the one or more determined real-time conversation objects, for example, the interface described below with regard to FIG. 6B. The system receives, from the user, a selection of a real-time conversation object from the one or more determined real-time conversation objects (506). In implementations where an interface includes the one or more determined conversation objects, the user may select a real-time conversation object from the one or more determined conversation objects included in the interface. The user device from which the user selects the real-time conversation object may include a list of links to the one or more determined conversation objects. When the user selects the real-time conversation object, the user device may send a request for the link to the system. Thus, the system may receive the request for the link associated with the selected conversation object.

The system accesses the selected conversation object (508). In some implementations, for example, where the system receives a request for a link associated with a selected conversation object, the system accesses the selected conversation object by accessing the link associated with the real-time conversation object. The system may send the accessed conversation object to the user device from which the real-time conversation object was selected. The user device may present the accessed conversation object to the user via an interface, for example, the interface shown in FIGS. 7A and 7B.

The system may receive, from the user, a message associated with the accessed conversation object (510). For example, through interaction with an interface that presents the accessed conversation object to the user on the user device, the user may enter and submit a message for the real-time conversation. The system updates the real-time conversation object to include the received message (512). Thus, the system may receive the message entered by the user and update the real-time conversation object to include the received message.

Figure 6A:
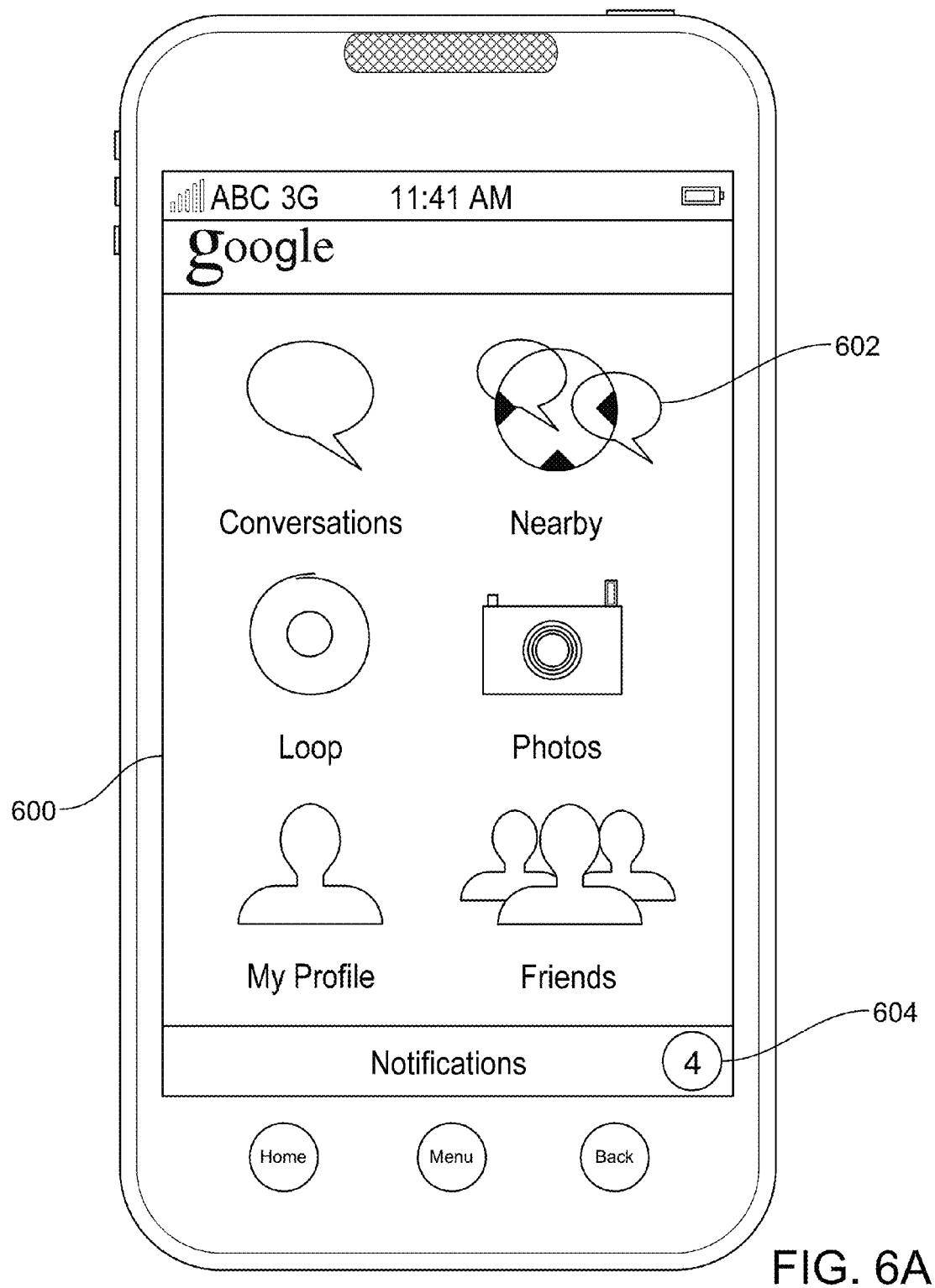
FIGS. 6A and 6B illustrate examples of interfaces for use in the discovery of a conversation.
Figure 6B:
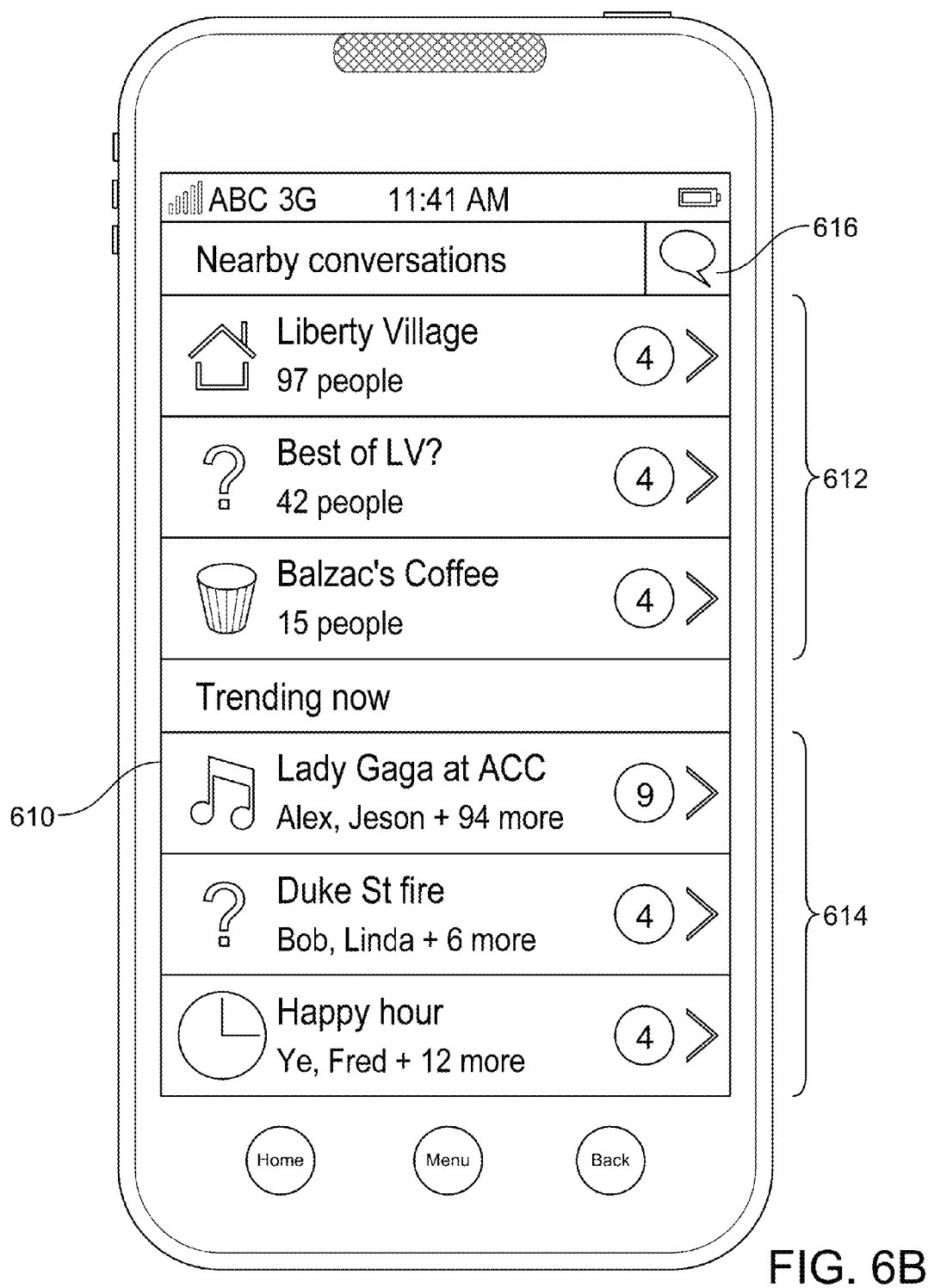

FIGS. 6A and 6B illustrate examples of interfaces for use in finding a real-time conversation object. The interfaces are described with reference to a system of one or more servers that provide the interfaces to a user and a user device. The system can be, for example, the conversation system 400 described above with reference to FIG. 4. The user device may be, for example, a mobile telephone.

The interface 600 shown in FIG. 6A represents a menu screen for an application running on the user device. The application may, among other functions, provide the interface through which the user interacts with the system. The interface 600 may include various links to the functions provided by the application. For example, the interface 600 may include a link titled "Nearby" 602, which links to a function for searching the system for real-time conversations that are near in location to the location of the user device. The interface 600 may include a region 604 that may provide an indication of new notifications received by the user device. The notifications may be similar to those described above with regard to region 338 of interface 330.

The interface 610 shown in FIG. 6B represents results from searching the system for real-time conversations that are near in location to the location of the user device. For example, when a user selects the link 602 from the interface 600, the system may search one or more indexes stored by the system that include various conversation parameters associated with real-time conversation objects, including, for example, a location associated with each of the real-time conversation objects. The system may determine one or more real-time conversation objects that relate to the location of the user device by determining that the location of the user device is within a certain distance of the location associated with the determined conversation objects.

The interface 610 may present the user with a list of the determined real-time conversation objects from the system's search. The interface 610 may include multiple regions for organizing the determined conversation in different manners. For example, the interface 610 may include a region 612 that lists nearby real-time conversations that are popular over a long period of time. The system may determine the long-term popularity of a real-time conversation in various ways, including, for example, by analyzing the total number of messages posted to the real-time conversation since its creation and/or the total number of users joined to the real-time conversation. The interface 610 may also include a region 614 that lists nearby real-time conversations that are currently popular. The system may determine the current popularity of a real-time conversation in various ways, including, for example, analyzing the number of users currently participating in the real-time conversation or the number of messages posted to the real-time conversation within the last day.

A real-time conversation included in the list of conversations displayed by the interface 610 may be represented in the list by a number of conversation parameters. For example, a real-time conversation may be represented by its topic, its icon, the number of users joined to the real-time conversation, the names of friends of the user of the user device joined to the real-time conversation, and/or the number of messages posted to the real-time conversation that have not been read by the user. The interface may also include a button 616 that allows the user to create a new conversation, if, for example, the system does not return a real-time conversation related to the topic about which the user wants to talk.

Figure 7A:
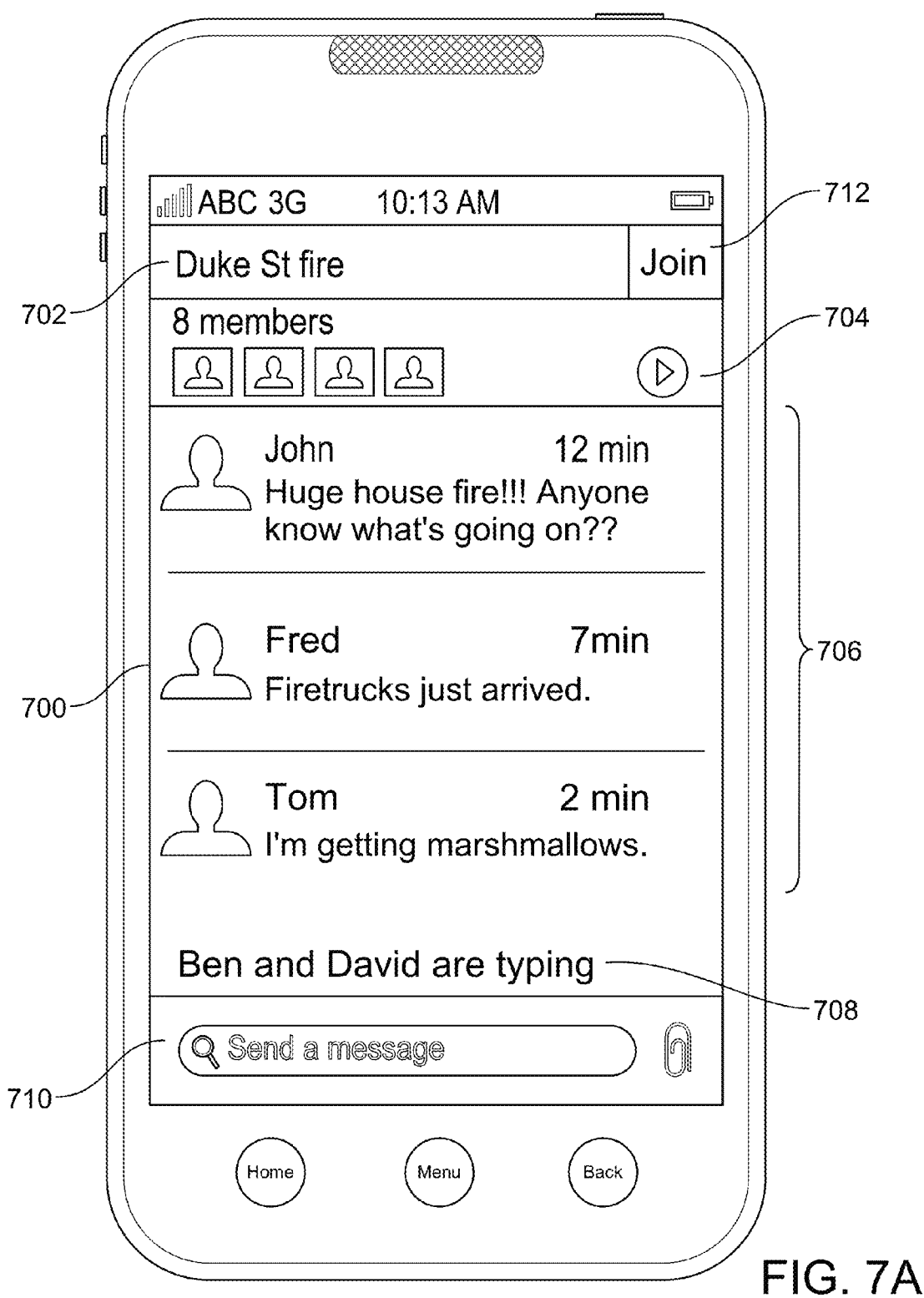
FIGS. 7A and 7B illustrate examples of interfaces for use in the participation in a conversation.
Figure 7B:
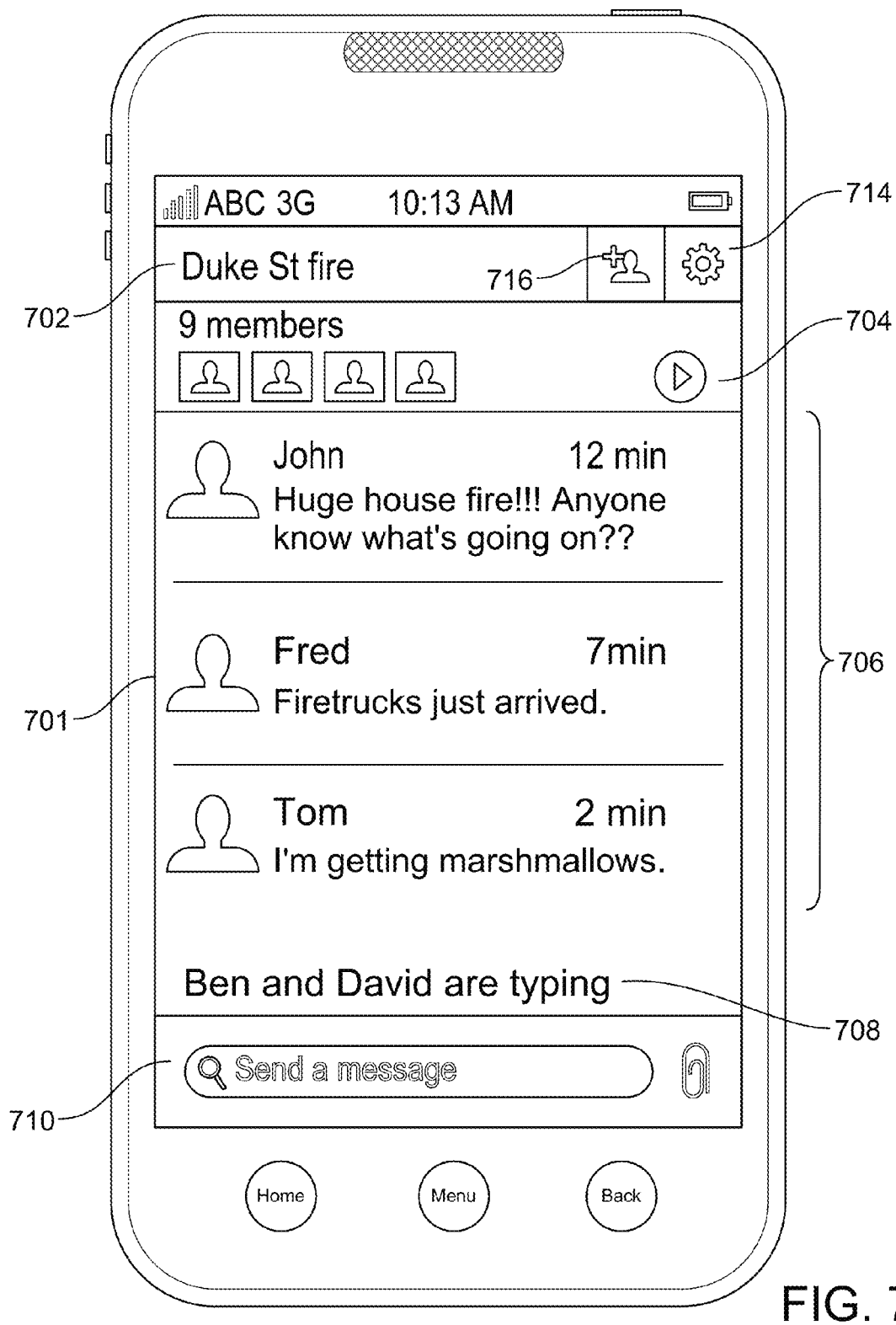

FIGS. 7A and 7B illustrate examples of interfaces for use in participating in a real-time conversation. The interfaces are described with reference to a system of one or more servers that provide the interfaces to a user and a user device. The system can be, for example, the conversation system 400 described above with reference to FIG. 4. The user device may be, for example, a mobile telephone.

Each of the interfaces 700 and 701 illustrated in FIGS. 7A and 7B, respectively, represent a visual representation of an accessed real-time conversation object. Interface 700 represents an example where the real-time conversation has not yet been joined by the user. Conversely, the interface 701 represents an example where the real-time conversation has been joined by the user. However, the interfaces 700 and 701 include many of the same elements, which will be described together.

Interfaces 700 and 701 may both include a region 702 that indicates the topic or name of the real-time conversation object. Interfaces 700 and 701 may both include a region 704 that represents the number of members joined to the real-time conversation and a list of identifiers associated with the joined users. For example, the region 704 may include a list of icons associated with a user (e.g., a picture of the user). The region 704 may allow the user to scroll through the list.

Interfaces 700 and 701 may both include a region 706 that lists the messages posted to the real-time conversation. In addition to the text of the message itself, each message included in the region 706 may be represented by one or more identifiers associated with the user that posted the message and an indication of when the message was posted. The one or more identifiers associated with the user that posted the message may include, for example, the name of the user and a photo of the user. The region 706 may allow the user to scroll through all of the messages posted to the real-time conversation. Additionally, the region 706 may order the listed messages in various manners. For example, the messages may be listed by the time at which the message was posted and/or by the relationship between the posting user and the viewing user.

Interfaces 700 and 701 may both include a region 708 that indicates whether other users that have joined the real-time conversation are currently typing messages to post to the conversation. Interfaces 700 and 701 may both include a region 710 that permits a user to enter a message to be instantly posted to the real-time conversation. The region 710 may include a text field that allows the user to enter a message and a submit button that allows the user to post the entered message.

However, with regard to interface 700, a user who is viewing or browsing the real-time conversation, but has not joined the real-time conversation, may be prevented from posting a message to the conversation. The interface 700 may prevent a user from interacting with region 710 altogether. Alternatively, if a user interacts with region 710, interface 700 may trigger a pop-up notification that asks the user whether the user would like to join the real-time conversation.

The interface 700 may include a region 712 that, when interacted with, permits a user to join the real-time conversation. Conversely, interface 701 may include region 714 that, when interacted with, permits a user to view and edit the settings of the real-time conversation. For example, region 714 may be a button that, when pressed by the user, presents the user with an interface 330. Interface may also include a region 716 that, when interacted with, permits a user to invite other users to join the real-time conversation. For example, when a user selects region 716, the system may send a notification (e.g., an e-mail) to the invited users with a link to the real-time conversation object and an identity of the inviting user. The system may not permit a user who has not joined the real-time conversation to view or edit the settings of the real-time conversation of invite other users to join the real-time conversation.

FIG. 8 is a block diagram of computing devices 800, 850 that may be used to implement the systems and methods described in this document, as either a client or as a server or plurality of servers. Computing device 800 is intended to represent various forms of digital computers, for example, laptops, desktops, workstations, personal digital assistants, servers, blade servers, mainframes, and other appropriate computers. Computing device 850 is intended to represent various forms of mobile devices, for example, personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, for example, display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In some implementations, the memory 804 is a computer-readable medium. In other implementations, the memory 804 is a volatile memory unit or units. In still other implementations, the memory 804 is a non-volatile memory unit or units.

The storage device 806 is capable of providing mass storage for the computing device 800. In some implementations, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In some implementations, a computer program product is tangibly embodied in an information carrier. The computer program product contains instructions that, when executed, perform one or more methods (e.g., those described above). The information carrier is a computer- or machine-readable medium, for example, the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In some implementations, the high-speed controller 808 is coupled to memory 804, display 816 (e.g., through a graphics processor or accelerator), and to high-speed expansion ports 810, which may accept various expansion cards (not shown). In these implementations, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, for example, a keyboard, a pointing device, a scanner, or a networking device (e.g., a switch or router), through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer (e.g., a laptop computer 822). Alternatively, components from computing device 800 may be combined with other components in a mobile device (not shown), for example, device 850. Each of such devices may contain one or more of computing device 800, 850, and an entire system may be made up of multiple computing devices 800, 850 communicating with each other.

Computing device 850 includes a processor 852, memory 864, an input/output device, for example, a display 854, a communication interface 866, and a transceiver 868, among other components. The device 850 may also be provided with a storage device, for example, a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, for example, control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In some implementations, the memory 864 is a computer-readable medium. In other implementations, the memory 864 is a volatile memory unit or units. In still other implementations, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, for example, placing identifying information on the SIMM card in a non-hackable manner.

The memory may include for example, flash memory and/or MRAM memory, as discussed below. In some implementations, a computer program product is tangibly embodied in an information carrier. The computer program product contains instructions that, when executed, perform one or more methods, such as those described above. The information carrier is a computer- or machine-readable medium, for example, the memory 864, expansion memory 874, or memory on processor 852.

Device 850 may communicate wirelessly through communication interface 866, which may include digital signal processing circuitry where necessary. Communication interface 866 may provide for communications under various modes or protocols, for example, GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur using a Bluetooth, WiFi, or other such transceiver (not shown). In addition, GPS receiver module 870 may provide additional wireless data to device 850, which may be used as appropriate by applications running on device 850.

Device 850 may also communication audibly using audio codec 860, which may receive spoken information from a user and convert it to usable digital information. Audio codex 860 may likewise generate audible sound for a user through, for example, a speaker in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining, at a server, a first topic for a conversation received from a first user;
   determining, at the server, location information related to a first location of a computing device associated with the first user;
   creating, at the server, one or more conversation objects that include the first topic;
   tagging the one or more conversation objects with the location information;
   indexing the one or more conversation objects in one or more indexes that include one or more other conversation objects that include the first topic by:
      updating the one or more indexes of conversation objects to include the one or more conversation objects based on one or more conversation parameters, and wherein the one or more conversation parameters include the first topic, messages associated with each of the one or more conversation objects, and the location information associated with each of the one or more conversation objects; and
      sorting the one or more conversation objects and the one or more other conversation objects included in the one or more indexes based on a level of message activity over a certain period of time for the messages associated with each conversation object and other messages associated with each other conversation object;
   receiving one or more search parameters from a second user, wherein the one or more search parameters include at least one second topic corresponding to the first topic for the conversation and at least one second location corresponding to the first location associated with the one or more conversation objects; and
   providing the sorted one or more conversation objects and the one or more other conversation topics to the second user in response to receiving the one or more search parameters.

2. The method of claim 1, wherein the at least one second location corresponds to the first location based on determining that the second location is within a certain distance of the first location.

3. The method of claim 1, further comprising:
   receiving, from the first user, a list of one or more other users to invite to be associated with the one or more conversation objects;
   sending, to one or more of the other users included in the received list, an invitation to be associated with the one or more conversation objects;

receiving, from one or more of the other users, an acceptance of the invitation; and updating the one or more conversation objects to include indicators of the one or more other users that accepted the invitation.

4. The method of claim 1, wherein the messages are associated with the one or more conversation objects based on a time and a date of each message.

5. The method of claim 1, wherein updating the one or more indexes of conversation objects further comprises sorting the one or more conversation objects and the one or more other conversation objects included in the one or more indexes based on locations associated with each of the conversation objects and each of the other conversation objects.

6. The method of claim 1, further comprising:
receiving a request from the first user to create the one or more conversation objects, and wherein:
determining the location information related to the first location of the computing device associated with the first user comprises receiving the location information that indicates the first location of the first user at a time the request to create the one or more conversation objects was received from the first user; and
tagging the one or more conversation objects with the location information comprises:
tagging the one or more conversation objects with the first location of the first user at the time the request to create the one or more conversation objects was received from the first user; and
maintaining the first location with the one or more conversation objects regardless of whether a current location of the first user changes.

7. The method of claim 1, further comprising:
providing updates to the second user of the sorted one or more conversation objects and the one or more other conversation topics with additional messages that are associated with the one or more conversation objects and the one or more other conversation topics that are received after the indexing.

8. The method of claim 1, wherein sorting the one or more conversation objects and the one or more other conversation objects included in the one or more indexes based on the level of message activity over the certain period of time for the messages associated with each conversation object includes identifying one or more conversation objects that are popular based on a number of messages posted to the one or more conversation objects within a last day.

9. A system comprising one or more computers and one or more storage devices storing instructions that are operable, when executed by the one or more computers, to cause the one or more computers to perform operations comprising:
determining a first topic for a conversation received from a first user;
determining location information related to a first location of a computing device associated with the first user;
creating one or more conversation objects that include the first topic;
tagging the one or more conversation objects with the location information;
indexing the one or more conversation objects in one or more indexes that include one or more other conversation objects that include the first topic by:
updating the one or more indexes of conversation objects to include the one or more conversation objects based on one or more conversation parameters, and wherein the one or more conversation parameters include the first topic, messages associated with each of the one or more conversation objects, and the location information associated with each of the one or more conversation objects; and
sorting the one or more conversation objects and the one or more other conversation objects included in the one or more indexes based on locations associated with each of the conversation objects and each of the other conversation objects;
receiving one or more search parameters from a second user, wherein the one or more search parameters include at least one second topic corresponding to the first topic for the conversation and at least one second location corresponding to the first location associated with the one or more conversation objects; and
providing the sorted one or more conversation objects and the one or more other conversation topics to the second user in response to receiving the one or more search parameters.

10. The system of claim 9, wherein the location information is based on an output of a global positioning system (GPS) sensor included in the computing device.

11. The system of claim 9, wherein the stored instructions include instructions that are further operable, when executed by the one or more computers, to cause the one or more computers to perform operations comprising:
receiving, from the first user, a list of one or more other users to invite to be associated with the one or more conversation objects;
sending, to one or more of the other users included in the list, an invitation to be associated with the one or more conversation objects;
receiving, from one or more of the other users, an acceptance of the invitation; and
updating the one or more conversation objects to include indicators of the one or more other users that accepted the invitation.

12. The system of claim 9, wherein the stored instructions are further operable, when executed by the one or more computers, to cause the one or more computers to perform operations comprising:
updating one or more indexes of conversation objects stored to include the one or more conversation objects by sorting the one or more conversation objects and the one or more other conversation objects included in the one or more indexes based on locations associated with each of the one or more conversation objects.

13. The system of claim 9, wherein the stored instructions include instructions that are further operable, when executed by the one or more computers, to cause the one or more computers to perform operations comprising:
receiving a request from the first user to create the one or more conversation objects; and
wherein the stored instructions are operable, when executed by the one or more computers, to cause the one or more computers to perform operations comprising:
determining the location information related to the first location of the first user by receiving the location information that indicates the first location of the first user at the time the first user requested the creation of the one or more conversation objects; and
tagging the one or more conversation objects with the location information by tagging the one or more conversation objects with the first location of the first user at the time the first user requested the creation of the one or more conversation objects and by maintaining the location with the one or more conversation objects regardless of whether a current location of the first user changes.

14. A non-transitory computer storage medium encoded with a computer program, the program comprising instructions that, when executed by one or more computers, cause the one or more computers to perform operations comprising:
    determining a first topic for a conversation received from a first user;
    determining location information related to a first location of a computing device associated with the first user;
    creating one or more conversation objects that include the first topic;
    tagging the one or more conversation objects with the location information;
    indexing the one or more conversation objects in one or more indexes that include one or more other conversation objects that include the first topic by:
        updating the one or more indexes of conversation objects to include the one or more conversation objects based on one or more conversation parameters, and wherein the one or more conversation parameters include the first topic, messages associated with each of the one or more conversation objects, and the location information associated with each of the one or more conversation objects; and
        sorting the one or more conversation objects and the one or more other conversation objects included in the one or more indexes based on a level of message activity over a certain period of time for the messages associated with each conversation object and other messages associated with each other conversation object;
    receiving one or more search parameters from a second user, wherein the one or more search parameters include at least one second topic corresponding to the first topic for the conversation and at least one second location corresponding to the first location associated with the one or more conversation objects; and
    providing the sorted one or more conversation objects and the one or more other conversation topics to the second user in response to receiving the one or more search parameters.

15. The medium of claim 14, wherein the location information is received from a computing device and based on an output of a global positioning system (GPS) sensor included in the computing device.

16. The medium of claim 14, wherein the program includes instructions that, when executed by the one or more computers, cause the one or more computers to perform operations comprising:
    receiving, from the first user, a list of one or more other users to invite to be associated with the one or more conversation objects;
    sending, to one or more of the other users included in the received list, an invitation to be associated with the one or more conversation objects;
    receiving, from one or more of the other users, an acceptance of the invitation; and
    updating the one or more conversation objects to include indicators of the one or more other users that accepted the invitation.

17. The medium of claim 14, wherein the instructions, when executed by one or more computers, cause the one or more computers to perform operations comprising:
    updating one or more indexes of conversation objects stored to include the one or more conversation objects by sorting the one or more conversation objects included in the one or more indexes based on locations associated with each of the one or more conversation objects.

18. The medium of claim 14, wherein the program further includes instructions that, when executed by the one or more computers, cause the one or more computers to perform operations comprising:
    receiving a request from the first user to create the one or more conversation objects, and wherein the instructions, when executed by one or more computers, cause the one or more computers to:
    determining location information related to the first location of the first user by receiving location information that indicates the first location of the first user at the time the first user requested the creation of the one or more conversation objects; and
    tagging the one or more conversation objects with the location information by tagging the one or more conversation objects with the first location of the first user at the time the first user requested the creation of the one or more conversation objects and by maintaining the location with which the one or more conversation objects is tagged regardless of whether a current location of the first user changes.

* * * * *